United States Patent [19]
Gundersen et al.

[11] Patent Number: 6,125,791
[45] Date of Patent: Oct. 3, 2000

[54] AQUATIC HOUSING SYSTEM

[75] Inventors: Kristen Alyssa Gundersen, Danbury; William Marc Fleischer, Oxford, both of Conn.

[73] Assignee: Pharmacal Research Laboratories, Inc., Naugatuck, Conn.

[21] Appl. No.: 09/204,040

[22] Filed: Dec. 1, 1998

[51] Int. Cl.[7] .................................................. A01K 63/00
[52] U.S. Cl. ........................................... 119/228; 119/245
[58] Field of Search .................................. 119/228, 245, 119/248, 249, 250, 251, 265

[56] References Cited

U.S. PATENT DOCUMENTS

| | | | |
|---|---|---|---|
| 3,757,739 | 9/1973 | Whitener | 119/245 |
| 3,774,575 | 11/1973 | Patterson | 119/245 |
| 4,120,265 | 10/1978 | Davis | 119/248 |
| 5,144,908 | 9/1992 | Tominaga | 119/248 |
| 5,144,909 | 9/1992 | Tominaga | 119/248 |
| 5,197,409 | 3/1993 | Hammond | 119/245 |
| 5,469,810 | 11/1995 | Chiang | 119/248 |
| 5,849,185 | 12/1998 | Judy, Jr. | 119/245 |

OTHER PUBLICATIONS

Zebrafish Systems by Aquatic Habitats.
Zebrafish Technology by Marine Biotech, Inc.

*Primary Examiner*—Michael J. Carone
*Assistant Examiner*—Elizabeth Shaw
*Attorney, Agent, or Firm*—Ohlandt, Greeley, Ruggiero & Perle; Geroge W. Rauchfuss, Jr.

[57] ABSTRACT

An aquatic housing system having a rack that supports at least two housing levels. Each level includes a tank frame from which the tanks are held in suspended relation in back to back rows. A tank lid covers at least two fish tanks. A water manifold has separate valves for separate ones of the fish tanks so that water flow can be separately controlled for each fish tank. A drip tray is situated beneath each row to collect water spills from the fish tanks. The trays are part of a drainage assembly in which the drain holes of each tray are connected to a down spout arrangement that flows water downwardly via drain holes disposed in the tray of each level. Capability to hold different sized tanks and use tank dividers is also disclosed.

36 Claims, 4 Drawing Sheets

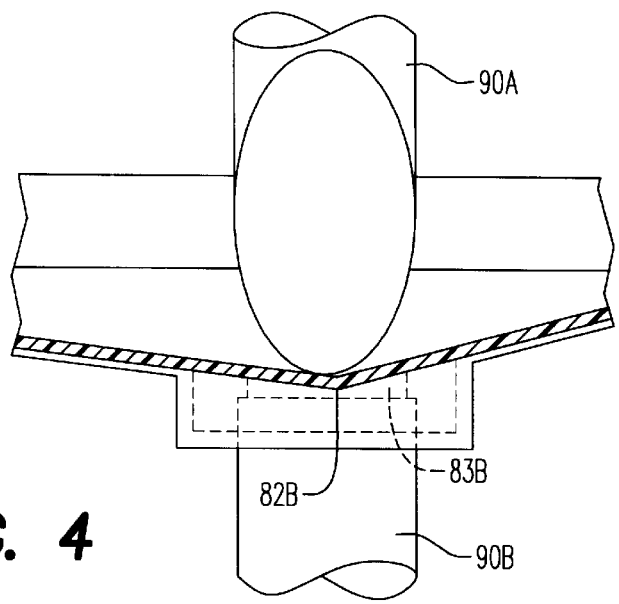
FIG. 4
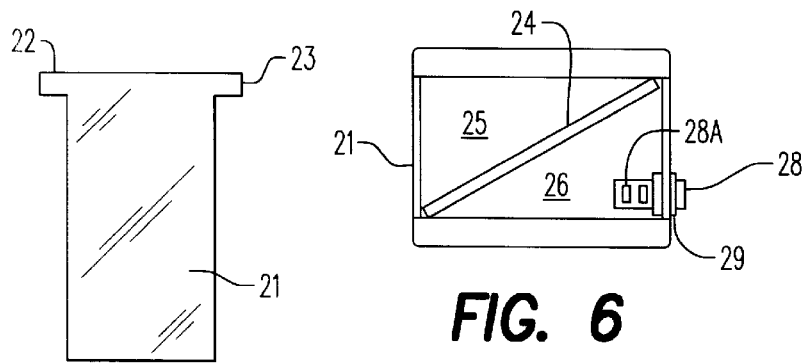
FIG. 5
FIG. 6
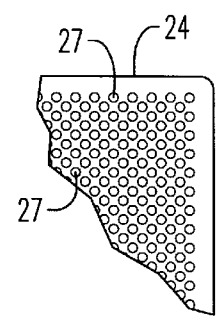
FIG. 7
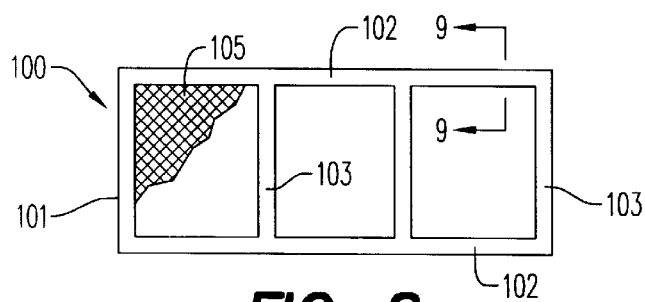
FIG. 8
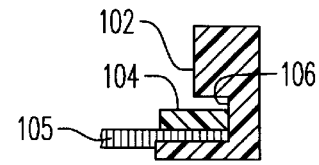
FIG. 9

AQUATIC HOUSING SYSTEM

FIELD OF INVENTION

This invention relates to system for housing animals and, in particular to an aquatic housing system for housing fish, particularly zebra fish.

BACKGROUND OF INVENTION

Aquatic housing systems are useful for breeding, hatching, feeding and maintaining fish. Aquatic housing systems have found particular use in the fields of developmental biology, pharmacology and medical research.

A system for housing fish is currently available from Marine Biotech, Inc. of Beverly, Mass. This system has a rack construction that allows for several levels or rows of fish tanks to be stacked vertically. Each level has a tank shelf that serves a twofold purpose. First, it serves as a shelf to hold a row of fish tanks. Second it serves as drainage for water that empties, spills, splashes or overflows from the tanks. The shelf slopes downward to the back of the rack where a vertical waste column is formed along the entire width of the rack. Each level also includes a water manifold for supplying a fresh supply of water to the tanks.

This prior system has a number of disadvantages. Light cannot effectively reach the fish as the rack is closed on three sides with walls formed of black plastic. This causes a problem with getting the fish to establish and respond to a light cycle.

The water flow from each manifold is adjusted by one valve at the end of the row. The water is discharged from the manifold by spray holes at spaced locations. This results in uneven water pressure and flow along the manifold. Thus, if a tank needs water, all other tanks will also be served with water. This can result in overflow conditions for some tanks as the tank in need is being filled. Also, it is difficult to align the tanks along the shelf to be in registry with the spray holes.

Each tank has its own lid with a front and a back hole. The back hole is for water to enter and the front hole is for food to enter. The hole size necessarily must be large enough to admit the water spray and food. This size has been so large that the fish can jump through the holes and out of the tank. Lost fish represent lost data as there is no way to identify a fish once it leaves its tank. The hole size compounds the problem of aligning the tanks with the water spray holes of the manifold. Misalignment results in water flowing down the sides of the tank and no water exchange in the tank. This is an unhealthy condition for the fish. If food is not accurately placed in the front hole, it can clog the front hole and/or pile up on the lid surface, thereby requiring frequent cleaning.

The tank contains a drain hole in its front side. This results in water flow down the front side, leaving substantially no room for researchers to put labels and research information on the front side where it can easily be viewed. Data is currently recorded on a side of the tank where it is difficult to see.

Another currently available tank has an inwardly sloped front wall that serves a self cleaning function. Water has to be flowing at extraordinary rates for the self cleaning function to work. This cause a rather high water turbulence that is stressful for the fish.

Only one size of tank is currently available. This presents some difficulty in keeping track of a large group of related fish if they have to be divided into a number of tanks.

The currently known racks are single sided in that they allow tanks to be presented to workers on only one side. This requires racks to be placed back to back with separate water distributors, pumps and waste water collecting vessels.

A main object of the present invention is to provide an aquatic housing system that overcomes the disadvantages of the prior systems.

Another object of the present invention is to provide an aquatic housing system that has a double sided rack.

Still another object of the present invention is to provide an aquatic housing system with a lid that covers two or more tanks.

Yet another object of the present invention is to provide an aquatic housing system that has an individual water valve for each tank.

A further object of the present invention is to provide an aquatic housing system having a tank suspension system.

Still a further object of the present invention is to provide an improved drainage system for an aquatic housing system.

Yet a further object is to provide an aquatic housing system that accommodates different sized tanks.

A still further object of the present invention is to provide a tank divider that allows one tank to divide two or more fish within the same tank.

SUMMARY OF INVENTION

An aquatic housing system according to the present invention includes a plurality of tanks, a tank frame, and a tank holding means for holding the plurality of tanks in suspended relationship to the tank frame. A water distributor distributes water to the tanks. A drainage assembly drains water from the tank holding means. A frame supports the tank frame, the water distributor and the drainage assembly.

In a preferred embodiment, the tank holding means holds a first group and a second group of tanks in a back to back relationship to one another. The drainage assembly includes a tray for capturing water from the tanks. The tray has a trough that slopes downward to a drain arranged to remove the captured water.

In another embodiment, the tank holding means holds the tanks below the tank frame. The tank frame includes first and second spaced apart elongated members. The holding means includes a plurality of tank rails and means for mounting the tank rails to the first and second elongated members. Adjacent ones of the rails are arranged for slidable insertion and removal of the tanks, whereby the tanks are retained by the rails in suspended relationship.

In a preferred embodiment, the tank frame includes a third elongated member. A plurality of tank rails; are mounted to the first and second elongated members and a second group of the plurality of tank rails to the second and third elongated members to form the back to back relationship. Adjacent ones of the rails are arranged for slidable insertion and removal of the tanks, whereby the tanks are retained by the rails in the suspended relationship.

In another embodiment, a tank lid is arranged to cover at least two of the tanks. The tank lid is removably disposed on the tank frame above the at least two tanks. The tank lid includes a lid frame and a net disposed in the frame.

In another embodiment there are first and second housing levels supported by the frame. A tank holding means holds a plurality of fish tanks in suspended relationship to a tank frame. Water is distributed from a water manifold to the trays and a tray captures water from the tanks.

In another embodiment of the present invention, a down spout arrangement carries water from a drain hole of an upper level to the drain hole of the next lower level.

In another embodiment, the tanks are supported in at least one back to back row.

In still another embodiment, a water manifold has a plurality of valves disposed along the manifold for selectively varying the water flow to at least two of the tanks.

BRIEF DESCRIPTION OF DRAWINGS

Other and further objects, advantages and features of the present invention will be understood by reference to the following specification in conjunction with the accompanying drawings, in which like reference characters denote like elements of structure and:

FIG. 4 is a cross sectional view taken along the lines 4—4 of FIG. 3;

FIG. 5 is an elevational view of a fish tank of the aquatic housing system of FIG. 1:

FIG. 6 is a top view of FIG. 5;

FIG. 7 is an elevational view of the divider of the fish tank of FIG. 5;

FIG. 8 is a top view of the lid of the aquatic housing system of FIG. 1; and

FIG. 9 is a cross sectional view taken along the lines 9—9 of FIG. 8.

DESCRIPTION OF PREFERRED EMBODIMENT

Figure 1:
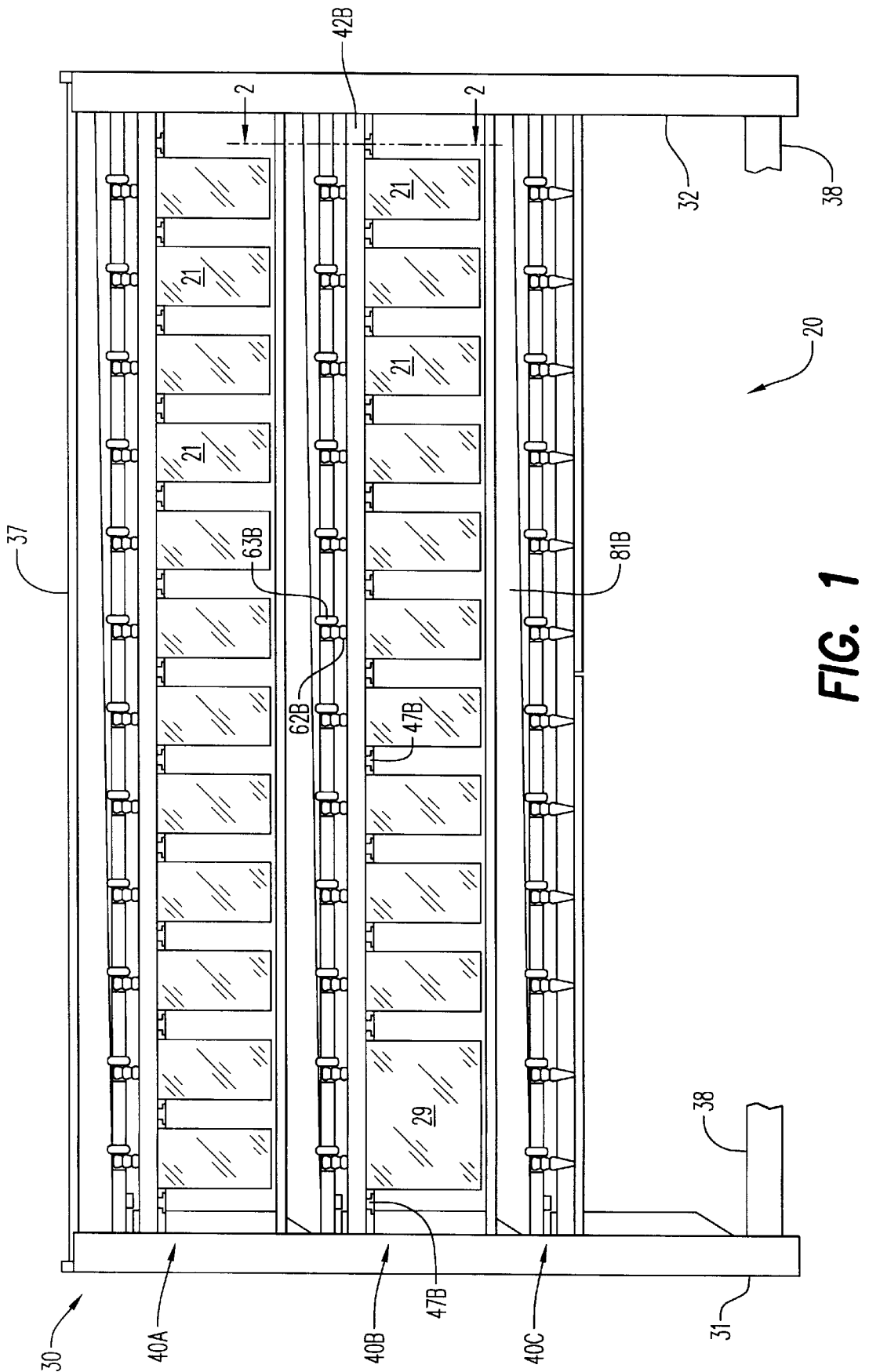
FIG. 1 is a an elevation view of an aquatic housing system according to the present invention.
Figure 2:
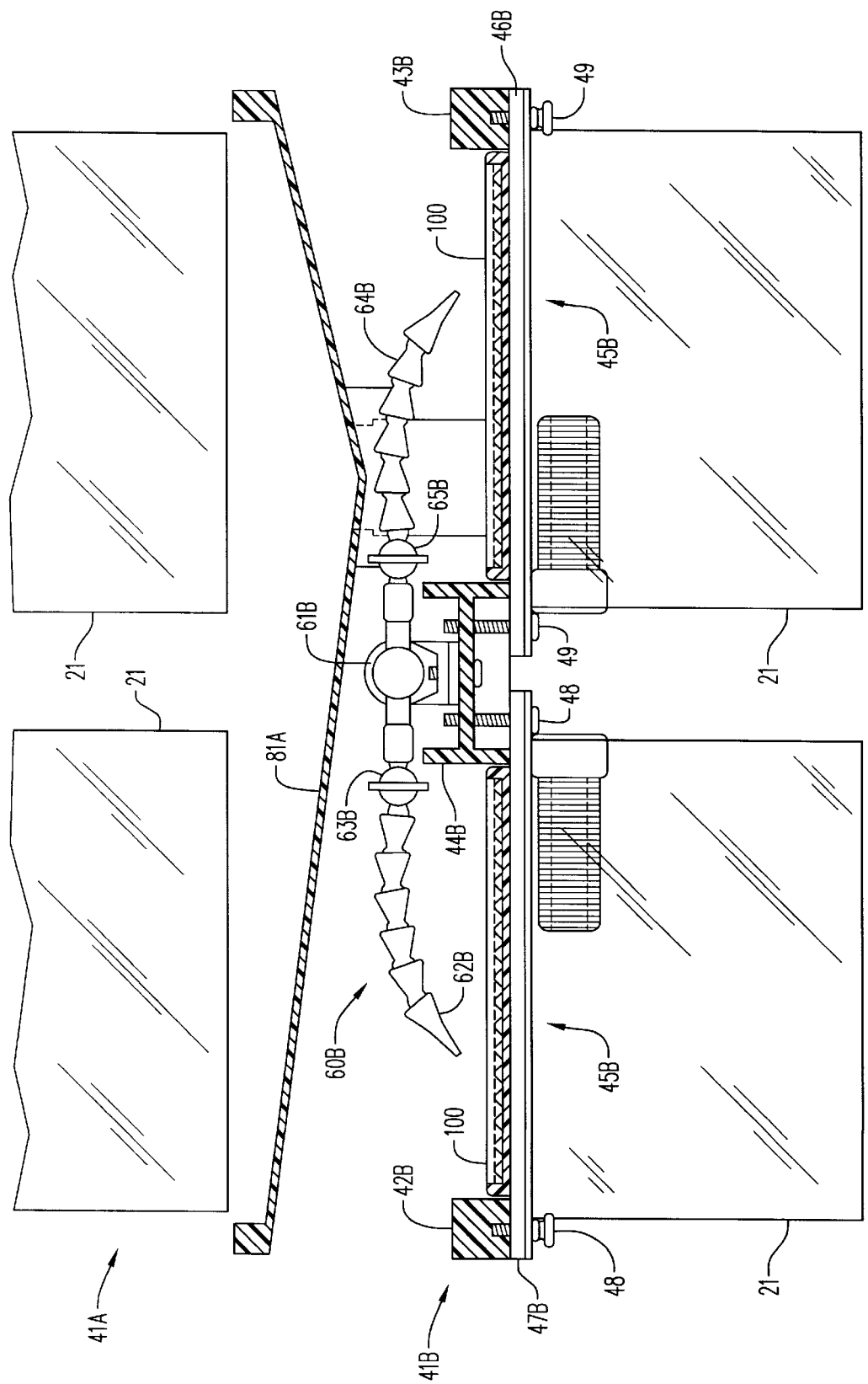
FIG. 2 is a cross sectional view taken along the lines 2—2 of FIG. 1.
Figure 3:
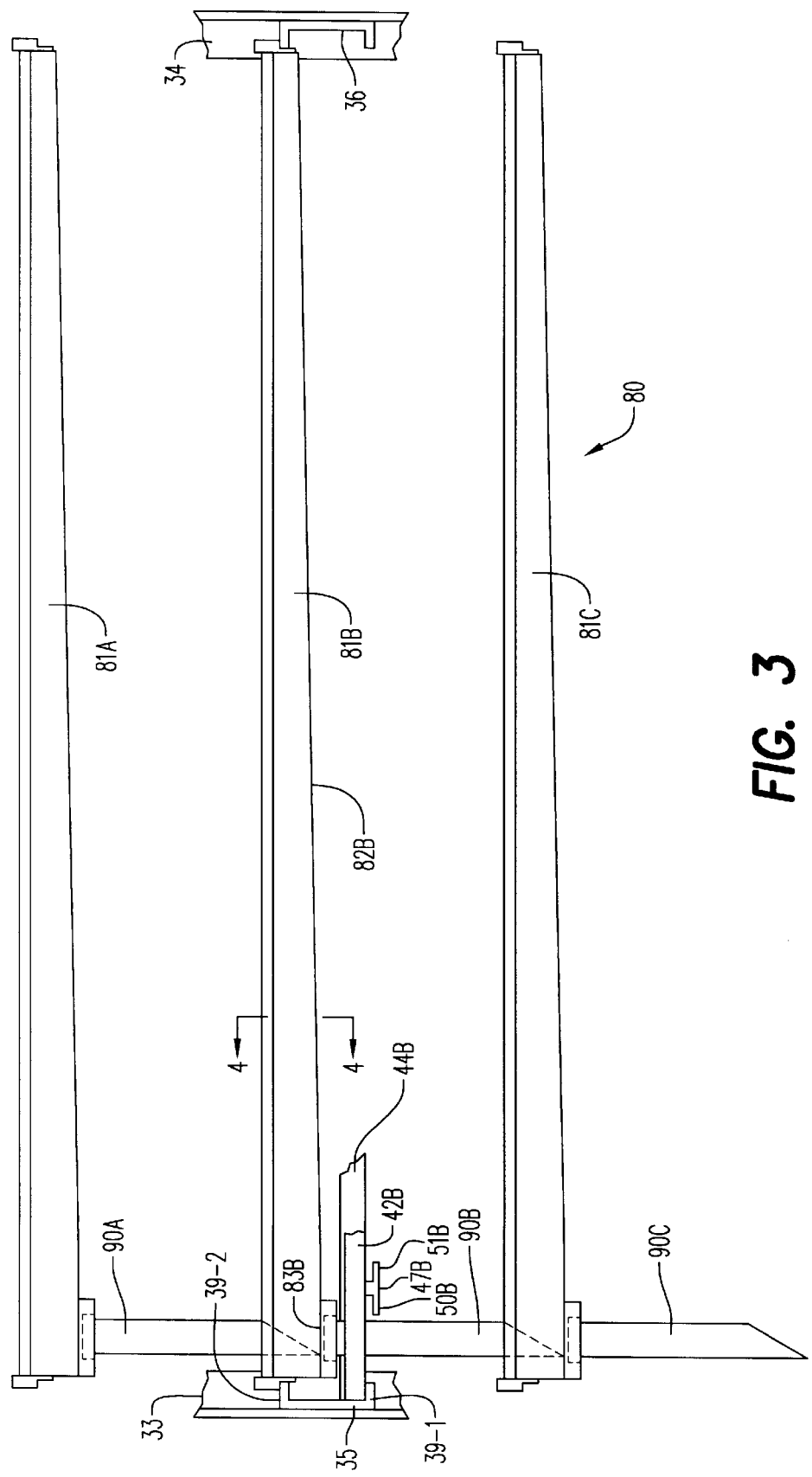
FIG. 3 is an elevational view of the drainage system and a partial view of its relationship to the rack of the aquatic housing system of FIG. 1.

With reference to FIGS. 1 through 3, there is provided an aquatic housing system generally represented by numeral 20. Aquatic housing system 20 includes a frame or rack 30, a plurality of housing levels 40A, 40B and 40C, a plurality of fish tanks 21 and a water drainage assembly 80.

Rack 30 includes four vertical corner posts, of which front corner posts 31 and 32 are shown in FIG. 1 and portions of rear corner posts 33 and 34 are shown in FIG. 3. Rack 30 also includes a plurality of side members that connect corner posts 31 and 33 at each housing level 40A, 40B and 40C. Only one such side member 35 is shown in FIG. 3. Rack 30 also includes a plurality of side members that similarly connect, as by bolts (not shown), corner posts 32 and 34 at each housing level 40A, 40B and 40C. Only one such side member 36 is shown in FIG. 3. Left hand corner posts 31 and 33 are connected to right hand corner posts 32 and 34 by a top cross piece 37 and a bottom cross piece 38. Bottom cross piece is shown in broken form in FIG. 1.

Corner posts 31 through 34 and side members 35 and 36 and the bolt fasteners are preferably fabricated from fiber glass material. This is important to provide a rust free rack 30 in a water environment. Rack 30 is also skeletal in construction so as to permit light to penetrate to all levels, thereby exposing the fish to proper light cycles breeding purposes.

Housing levels 40A, 40B and 40C are substantially identical. Accordingly, only housing level 40B will be described in detail. Housing level 40B includes a tank frame 41B, a fish tank holding means 45B, a plurality of fish tank lids 100, a water manifold 60B, a drip tray 81B and a down spout 90B.

Tank frame 41B includes a front elongated member or bar 42B, a rear elongated member or bar 43B and a center elongated member 44B. Front and rear elongated members have a bar shape and center elongated member 44B has an H shape. These shapes are a matter of choice and can vary from one design to another and still be within the contemplation of the present invention. Elongated members 41B, 42B and 43B are preferably fabricated with fiber glass material.

Fish tank holding means 45B includes a plurality of tank rails 47B that are spaced apart in parallel fashion between elongated member 42B and center elongated member 44B to form a front fish tank suspension row. Fish tank holding means 45B includes a plurality of tank rails 46B that are spaced apart in parallel fashion between elongated member 43B and center elongated member 44B to form a rear fish tank suspension row. Tank rails 47B are joined to front elongated member 42B and to center elongated member 44B by screws 48. Tank rails 46B are joined to rear elongated member 43B and to center elongated member 44B by screws 49. Tank rails 46B and 47B and screws 48 and 49 are preferably fabricated with plastic.

With reference to FIGS. 1, 3 and 5, adjacent tank rails 47B serve to suspend fish tanks 21. To this end, each tank rail 47B has an inverted T shape with flanges 50B and 51B extending downwardly from and along its bottom surface. Fish tanks 22 have a flange 23 and a flange 24 extending from opposite sides at the top thereof. Fish tank flanges 23 and 24 slidably engage tank rail flanges 51B and 50B of adjacent ones of tank rails 47B. That is, fish tanks 21 are arranged for slidable insertion and removal from adjacent ones of tank rails 47B. Tank rails 46B have a similar inverted T shape to hold fish tanks 21. While inserted, fish tanks 21 are suspended from tank frame 41B by tank rails 47B and 46B of fish tank holding means 45B in back to back rows. This back to back row construction gives rack 30 the appearance of a double sided rack and maximizes housing capacity.

Tank frame 41B and drip tray 81B each extend between the left hand and right hand sides of the supporting frame or rack 30. To this end, the left hand ends of elongated members 42B, 43B and 44B rest upon side member 35 and the right hand ends of elongated members 42B, 43B and 44B rest on side member 36. Side members 35 and 36 are preferably U shaped as shown in FIG. 3 with the bottom legs 39-1 of the U shape supporting the ends of elongated members 42B, 43B and 44B. The opposite ends of drip tray 81B rest on the upper legs 39-2 of U shaped sides 35 and 36.

Water manifold 60B includes a center pipe 61B that extends along the length of housing level 40B. A plurality of individual nozzles 62B are tapped to center pipe 61B at spaced locations in-between adjacent tank rails 47B of the front suspension row so as to be above each fish tank 21. Each nozzle 62B has an associated valve 63B so as to permit water flow adjustment for individual tanks. A plurality of individual nozzles 64B are tapped to center pipe 61B at spaced locations in-between adjacent tank rails 46B of the front suspension row so as to be above each fish tank 21. Each nozzle 64B has an associated valve 65B. Center pipe 61B has one of its ends plugged and the other of its ends joined to a water source (not shown). Center pipe 61B is situated above and receives support from center elongated member 44B of tank frame 44B.

With reference to FIGS. 8 and 9, fish tank lid 100 extends over at least two or more fish tanks 21. According to one design embodying the present invention, fish tank lid 100 extends over three fish tanks. Fish tank lid 100 has a ladder shaped frame 101 that has side rails 102 and rung rails 103. Fish tank lid 100 has dimensions that allow it to fit loosely (for easy insertion and removal) between elongated H member 44B and either elongated bar members 42B or 43B and to rest on the tops of tank rails 46B or 47B. A ladder shaped retainer 104 snap fits within a slot 106 formed in an interior side of side rails 102 to retain a net or web 105. Net 105 has a mesh size small enough to keep the fish from jumping through, but large enough to permit food to be inserted into fish tanks 21. This allows the entire top of fish tank 21 to be available for feeding as well as for water flow from nozzles 64B. Lid cleaning is also facilitated as fewer lids need to be cleaned. Lids 100 can be cleaned either by wiping or by automatic washer. Retainer 104 can be snapped out of slot 106 for cleaning or removal of net 105.

With reference to FIGS. 2 and 5 through 7, fish tank 21 is shown to be a rectangular box shape that has flanges 22 and 23 disposed along a pair of opposite upper edges. A divider 24 fits slidingly between opposite corners of fish tank 21 to divide it into two areas 25 and 26. Divider 24 contains a plurality of apertures 27 that are large enough to allow water circulation but small enough so the fish cannot go through. Tank divider 24 allows isolation of a few or specifically identified fish. For example, new genetic strains need to be isolated for future breeding purposes.

Water is drained from fish tank 21 by way of a drain pipe 28 located at the top rear of fish tank 21. Drain pipe 28 has apertures 28A disposed about its periphery and along its length. Apertures 28A are small enough to prevent the fish from passing through, but large enough to pass food and other waste. Drain pipe 28 is mounted to fish tank 21 via a grommet 29. By locating the drain on the back of fish tank 21, the front is available in its entirety for record and note labels. Also, when removing a tank, water splashes backward to drip tray 81B and not forward toward the person removing the tank.

The fish tanks 21 are generally of a standard size. However, as shown in FIG. 1, a larger fish tank 29 can be used as tank rails 47B are easily moved or removed by loosening screws 48 to accommodate different sized fish tanks 21 and 29.

With reference to FIGS. 1 through 4, drainage assembly 80 includes drip trays 81A, 81B and 81C of each housing level 40A, 40B and 40C and down spouts 90A, 90B and 90C. As drip trays 81A, 81B and 81C are substantially identical, only drip tray 81B will be described in detail.

Drip tray 81B has a trough 82B that is sloped or angled downwardly toward one end where a drain hole 83B is located. This assures that water from fish tanks 21 will flow along tray 81B toward drain hole 83B. Down spout 90B fits within drain hole 83B. Troughs 82A, 82B and 82C are each offset from center in order to provide clearance space for the water manifold of the next lower level. For example, trough 82A of drip tray 81A is offset from center to accommodate water manifold 60B of housing level 40B.

In operation, water from fish tanks 21 flows downwardly (from right to left in FIGS. 1 and 2) along the troughs of drip trays 81A, 81B and 81C toward their respective drain holes 83A, 83B and 83C. Water then flows through the drain holes 83A, 83B and 83C and down their associated down spouts 90A, 90B and 90C to the next lowest housing level. Thus, water from drip tray 81A flows through down spout 90A to drain hole of housing level 40B. Water from drip tray 81B and from down spout 90A flows through down spout 90B to drain hole 83C of housing level 40C. Water from drip tray 81c together with water from down spout 90B flows through down spout 90C to a waste water vessel (not shown).

Drip trays 81A, 81B and 81C and fish tanks 21 and 29 are all fabricated with transparent plastic. This allows proper light cycles for the fish as well as ease of observation.

The present invention having been thus described with particular reference to the preferred forms thereof, it will be obvious that various changes and modifications may be made therein without departing from the spirit and scope of the present invention as defined in the appended claims.

What is claimed is:

1. An aquatic housing system comprising:
   a plurality of tanks;
   a tank frame;
   tank holding means for holding said plurality of tanks in suspended relationship to said tank frame;
   a water distributor for distributing water to said tanks;
   a drainage assembly for draining water from said tank holding assembly; and
   a frame for supporting said tank frame, said water distributor and said drainage assembly.

2. The aquatic housing system according to claim 1, wherein said tank holding means holds a first group and a second group of said plurality of tanks in a back to back relationship to one another.

3. The aquatic housing system according to claim 2, wherein said tank frame includes a first, a second and a third elongated member spaced apart from one another; and
   wherein said holding means includes:
      a plurality of tank rails; and
      means for mounting a first group of said plurality of tank rails to said first and second elongated members and a second group of said plurality of tank rails to said second and third elongated members to form said back to back relationship; and
   wherein adjacent ones of said rails are arranged for slidable insertion and removal of said tanks, whereby said tanks are retained by said rails in said suspended relationship.

4. The aquatic housing system according to claim 1, wherein said drainage assembly includes a tray for capturing water from said tanks, said tray having a trough and a drain arranged to remove said captured water from said tray by way of said trough.

5. The aquatic housing system according to claim 4, wherein said tray slopes downward toward said drain.

6. The aquatic housing system according to claim 1, wherein said holding means holds said tanks below said tank frame.

7. The aquatic housing system according to claim 6, wherein said tank frame includes first and second spaced apart elongated members;
   wherein said holding means includes:
      a plurality of tank rails; and
      means for mounting said tank rails to said first and second elongated members; and
   wherein adjacent ones of said rails are arranged for slidable insertion and removal of said tanks, whereby said tanks are retained by said rails in said suspended relationship.

8. The aquatic housing system according to claim 1, and further comprising a tank lid arranged to cover at least two of said tanks.

9. The aquatic housing system according to claim 8, wherein said tank lid is removably disposed on said tank frame above said at least two tanks.

10. The aquatic housing system according to claim 9, wherein said tank lid includes a lid frame and a net disposed in said frame.

11. The aquatic housing system according to claim 10, wherein said tank frame is shaped to hold said lid frame above said at least two tanks.

12. The aquatic housing system according to claim 1, and further comprising a tank divider, said tank divider being a perforated sheet; and
wherein at least one of said tanks is box shaped, said tank divider fitting diagonally between opposite corners of said at least one tank.

13. An aquatic housing system comprising:
a frame;
first and second housing levels supported by said frame, each said housing level including
a plurality of tanks;
a tank frame;
tank holding means for holding said plurality of tanks in suspended relationship to said tank frame;
a water manifold for distributing water to said tanks; and
a tray for capturing water from said tanks.

14. An aquatic housing system according to claim 13, and further comprising a drainage assembly for removal of said captured water from said trays, said drainage assembly including:
said tray of each said housing level, each said tray having a trough and a drain;
a down spout arrangement for guiding said captured water from the drain of said first housing level toward the drain of said second housing level.

15. An aquatic housing system according to claim 14, wherein said down spout arrangement removes the water captured by the trays of both the first and second housing levels by way of the drain of said second housing level.

16. An aquatic housing system according to claim 15, wherein said down spout arrangement includes a first down spout joined to the drain of said first housing level and a second down spout joined to the drain of said second housing level.

17. An aquatic housing system according to claim 16, wherein said frame supports said first housing level above said second housing level such that said drains and said first and second down spouts are in substantial vertical alignment.

18. An aquatic housing system according to claim 17, wherein each said tray slopes downward toward its drain.

19. An aquatic housing system according to claim 18, wherein said tank holding means includes:
a plurality of tank rails;
first, second and third elongated members; and
means for mounting a first group of said plurality of tank rails to said first and second elongated members and a second group of said plurality of tank rails to said second and third elongated members to form a back to back relationship; and
wherein adjacent ones of said rails are arranged for slidable insertion and removal of said tanks, whereby said tanks are retained by said rails in said suspended relationship.

20. An aquatic housing system according to claim 19, and further comprising a tank lid arranged to cover at least two of said tanks.

21. An aquatic housing system according to claim 20, wherein said tank lid is removably disposed on said tank frame above said at least two tanks; and
wherein said tank frame is shaped to hold said tank lid above said at least two tanks.

22. An aquatic housing system according to claim 18, wherein said tank lid includes a lid frame and a net disposed in said frame.

23. The aquatic housing system according to claim 13, and further comprising a tank divider, said tank divider being a perforated sheet; and
wherein at least one of said tanks is box shaped, said tank divider fitting diagonally between opposite corners of said at least one tank.

24. An aquatic housing system comprising:
a frame;
first and second housing levels supported by said frame, each said housing level including
a plurality of tanks;
means for supporting said plurality of tanks in at least one row;
a water manifold for distributing water to said tanks; and
a tray for capturing water from said tanks; and
a drainage assembly for removal of said captured water from said trays, said drainage assembly including:
said tray of each said housing level, each said tray having a trough and a drain, said tray sloping downward toward said drain; and
a down spout arrangement for guiding said captured water from the drain of said first housing level toward the drain of said second housing level.

25. An aquatic housing system according to claim 24, wherein said down spout arrangement removes the water captured by the trays of both the first and second housing levels by way of the drain of said second housing level.

26. An aquatic housing system according to claim 25, wherein said down spout arrangement includes a first down spout joined to the drain of said first housing level and a second down spout joined to the drain of said second housing level.

27. An aquatic housing system according to claim 26, wherein said frame supports said first housing level above said second housing level such that said drains and said first and second down spouts are in substantial vertical alignment.

28. An aquatic housing system according to claim 24, wherein said supporting means supports said plurality of tanks in two back to back rows.

29. The aquatic housing system according to claim 24, and further comprising a tank divider, said tank divider being a perforated sheet; and
wherein at least one of said tanks is box shaped, said tank divider fitting diagonally between opposite corners of said at least one tank.

30. An aquatic housing system comprising:
a frame;
first and second housing levels supported by said frame, each said housing level including
a plurality of tanks;
means for supporting said plurality of tanks in at least one row;
a water manifold for distributing water to said tanks;
a tray for capturing water from said tanks; and
a tank lid arranged to cover at least two of said tanks.

31. An aquatic housing system according to claim 30, wherein said tank lid is removably supported by supporting means above said at least two tanks.

32. An aquatic housing system according to claim 31, wherein said tank lid includes a lid frame and a net disposed in said frame.

33. The aquatic housing system according to claim 30, and further comprising a tank divider, said tank divider being a perforated sheet; and wherein at least one of said tanks is box shaped, said tank divider fitting diagonally between opposite corners of said at least one tank.

34. An aquatic housing system comprising:

a frame;

first and second housing levels supported by said frame, each said housing level including a plurality of tanks;

said frame including means for supporting said plurality of tanks in two back to back rows;

a water manifold for distributing water to said tanks; and a tray for capturing water from said tanks.

35. The aquatic housing system according to claim 34, and further comprising a tank lid removably supported by said supporting means to cover at least two of said tanks.

36. The aquatic housing system according to claim 34, and further comprising a tank divider, said tank divider being a perforated sheet; and wherein at least one of said tanks is box shaped, said tank divider fitting diagonally between opposite corners of said at least one tank.

* * * * *